United States Patent
Karol (10) Patent No.: US 11,203,122 B2
(45) Date of Patent: Dec. 21, 2021

(54) GOAL-BASED ROBOT ANIMATION

(71) Applicant: Digital Dream Labs, LLC, Pittsburgh, PA (US)

(72) Inventor: Kevin M. Karol, San Francisco, CA (US)

(73) Assignee: Digital Dream Labs, LLC, Pittsburgh, PA (US)

( * ) Notice: Subject to any disclaimer, the term of this patent is extended or adjusted under 35 U.S.C. 154(b) by 566 days.

(21) Appl. No.: 16/054,977

(22) Filed: Aug. 3, 2018

(65) Prior Publication Data

US 2020/0039077 A1 Feb. 6, 2020

(51) Int. Cl.
*B25J 9/16* (2006.01)
*B25J 11/00* (2006.01)
*B25J 19/02* (2006.01)

(52) U.S. Cl.
CPC ............ *B25J 11/001* (2013.01); *B25J 9/163* (2013.01); *B25J 11/0015* (2013.01); *B25J 19/023* (2013.01)

(58) Field of Classification Search
CPC ........ B25J 11/001; B25J 19/023; B25J 9/163; B25J 11/0015; B25J 9/161; G05B 2219/45084; G05B 2219/36488
See application file for complete search history.

(56) References Cited

U.S. PATENT DOCUMENTS

| | | | |
|---|---|---|---|
| 9,594,377 B1* | 3/2017 | Perkins | G05D 1/0274 |
| 9,987,745 B1* | 6/2018 | Berard | B25J 9/1661 |
| 10,105,845 B1* | 10/2018 | Jackowski | B25J 9/1617 |
| 10,514,687 B2* | 12/2019 | Brooks | B25J 9/163 |
| 2005/0240307 A1* | 10/2005 | Kuroki | B25J 13/085 700/245 |
| 2006/0095160 A1* | 5/2006 | Orita | G05D 1/027 700/248 |
| 2007/0050088 A1* | 3/2007 | Murray, IV | B25J 9/161 700/250 |
| 2013/0345875 A1* | 12/2013 | Brooks | G05B 19/42 700/259 |
| 2015/0314440 A1* | 11/2015 | Parker | B25J 9/163 700/253 |

* cited by examiner

*Primary Examiner* — Masud Ahmed
(74) *Attorney, Agent, or Firm* — David G. Oberdick (57) ABSTRACT

Methods, systems, and apparatus, including computer programs encoded on computer storage media, for performing goal-based robot animation. One system includes a robot configured to receive a goal that specifies a goal state to be attained by the robot or one of the components. A collection of animation tracks is searched to identify one or more animation tracks that when executed by the robot cause the robot to perform one or more physical movements to satisfy the goal state. The identified one or more animation tracks are executed to perform the one or more physical movements to satisfy the received goal state.

19 Claims, 4 Drawing Sheets

GOAL-BASED ROBOT ANIMATION

BACKGROUND

This specification relates to robots, and more particularly to robots used for consumer purposes.

A robot is a physical machine that is configured to perform physical actions autonomously or semi-autonomously. Robots have one or more integrated control subsystems that effectuate the physical movement of one or more robotic components in response to particular inputs. Robots can also have one or more integrated sensors that allow the robot to detect particular characteristics of the robot's environment.

Modern day robots are typically electronically controlled by dedicated electronic circuitry, programmable special-purpose or general-purpose processors, or some combination of these. Robots can also have integrated networking hardware that allows the robot to communicate over one or more communications networks, e.g., over Bluetooth, NFC, or WiFi.

Some robots can perform human-designed animations. In this specification, an animation performed by a physical robot includes a group of one or more coordinated movements by physical components of a robot. An animation can thus also refer to data that encodes such movements and encodes the coordination of the components with each other, which data will also be referred to simply as an animation when the meaning is clear from context. In some instances, an animation alternatively or in addition also specifies how to control other robot components that do not result in physical movement, e.g., electronic displays, lights, and sounds, to name just a few examples.

Human animators can manually design robot animations by using software that generates data encoding the animation movements. This process of creating pregenerated animations is generally laborious and time-intensive. In some implementations, such animation movements are encoded as keyframes. Each keyframe can for example encode a timestamp, a starting point, an ending point, and a duration for a particular movement of a particular component. For example, a robot can effectuate a head tilt from angle A to angle B lasting 1 second by executing a keyframe that specifies these three items of data. Suitable techniques for generating animation keyframes for execution by a robot are described in commonly-owned U.S. patent application Ser. No. 15/633,382, filed Jun. 26, 2017, and entitled "Animation Pipeline for Physical Robot," which is herein incorporated by reference.

Keyframes can be sequenced into tracks, with each track corresponding to a different component of the robot. The robot can then execute a track for a component by using the keyframes of the track to generate control signals for the corresponding component that effectuates the animation for that component. An animation can have one or more tracks, which can be layered together so that the robot can execute actions using multiple components simultaneously. Suitable techniques for layering tracks of an animation are described in commonly-owned U.S. patent application Ser. No. 15/633,652, filed Jun. 26, 2017, and entitled "Robot Animation Layering," which is herein incorporated by reference.

In order to execute an animation track, a robot converts the information encoded into the keyframes into a trajectory for the corresponding component. A trajectory is thus data representing how a component moves over time. A trajectory can encode data about a position, e.g., an angle, at which a component should be over time, or a rate of change, e.g., a speed of a wheel turning, at which a component should operate over time. For example, from the example keyframe above, a robot can compute a trajectory that represents that within the keyframe duration, the robot head should be moving between angle A and angle B at a rate given by the difference between A and B divided by the duration. The trajectory information can be represented in any appropriate format, e.g., by a function that maps each of one or more time slices to a rate or a position for a particular component.

Pregenerated animations are rich in detail and can provide a robot with a life-like appearance. However, as described above, the process for creating such animations is laborious and time intensive. In addition, not all circumstances are predictable enough for a corresponding animation to be pregenerated in advance.

Moreover, maintaining pregenerated animations presents serious maintainability problems. For example, suppose that an animation team generates 4 new pregenerated animations during the week. In order for those animations to be integrated into the robot's behavior, the software development team must manually determine in which scenarios the new pregenerated animations should occur. After making such difficult decisions, the software development team must then modify the source code in the appropriate places adding new case statements wherever necessary in order to shoehorn in the new pregenerated animations.

These maintainability problems can present combinatorial complexity as well. For example, suppose that the animation team decides to add a new "mood" for the robot in which the robot acts "sad" by driving, turning, speaking, and looking around slower than the robot's normal mood. Adding support for the new mood may require the animations to generate a new version of every available pregenerated animation to support the new mood. All of these new versions then must be integrated into the source code in appropriate places and for appropriate situations.

As one can see, the expressiveness of pregenerated animations is a maintainability and functionality bottleneck for dynamic and lifelike robot animation at scale.

SUMMARY

This specification describes technologies for implementing goal-based animation. Goal-based animation means that the components of the robot that generate goal states are functionally isolated from components of the robot that determine which animation tracks are needed to attain the goal state.

In general, one innovative aspect of the subject matter described in this specification can be embodied in methods that include the actions of receiving a goal that specifies a goal state to be attained by the robot or one of the components; searching a collection of animation tracks to identify one or more animation tracks that when executed by the robot cause the robot to perform one or more physical movements to satisfy the goal state; and executing the identified one or more animation tracks to perform the one or more physical movements to satisfy the received goal state. Other embodiments of this aspect include corresponding robotic systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. The goal state specifies a position or an orientation of the robot or one of the components. The position is a room in a particular building or an aerial position above a surface. The goal state specifies a position or a style of simulated robot eyes. Searching the collection of animation tracks comprises: obtaining a current emotion state for the robot, wherein the current emotion state is one value of a plurality of different emotion states; and penalizing animation tracks that do not match the current emotion state for the robot. Searching the collection of animation tracks comprises recursively subdividing a distance between a current state of the robot and the goal state. The actions include generating a plurality of candidate sets of animation tracks; computing a score for each of the plurality candidate sets of animation tracks; ranking the candidate sets of animation tracks by the respective scores; and selecting a highest-scoring candidate animation track. Computing a score for a candidate set of animation tracks comprises: computing the score based on danger in the environment, a measure of time required to complete the candidate set of animation tracks, and a number of tracks in the candidate set. Computing a score for a candidate set of animation tracks comprises: computing a measure of concordance of the tracks in the candidate set with a current emotion state of the robot. The collection of animation tracks are each portions of pregenerated robot animations. Each pregenerated robot animation is a human-designed robot animation having multiple tracks. The goal is received from a behavior engine that is functionally isolated from an animation selector that searches the collection of animation tracks. The collection of animation tracks comprises human-designed animation tracks, human-rated animation tracks, or both. The collection of animation tracks comprises animation tracks that were selected using a machine-learning model trained on human-designed animation tracks, human-rated animation tracks, or both.

The subject matter described in this specification can be implemented in particular embodiments so as to realize one or more of the following advantages. A robot can leverage a collection of animation tracks in order to implement goal-based animation. To do so, the robot can analyze the data inside of an animation track, e.g., the keyframe information, in order to make decisions based on what the animation track will actually do to the robot.

Goal-based animation selection allows graceful fallback for important situations where it's essential that a track operate with very tight-defined motion requirements and where no pregenerated animation exists that satisfies such requirements. In addition, goal-based animation selection also allows a robot to maintain characterful aspects while maintaining motion-specific requirements, e.g., keeping the camera on a person or another object.

In addition, the robot can support a much larger and wider variety of animations while using less memory. In other words, rather than needing to store and rely on a voluminous collection of pregenerated animations, the robot can achieve a similar measure of variety of lifelike movements using a much smaller collection of animation tracks. This mechanism further allows faster scaling up of the number of supported animations. In addition, these techniques allow other developers or even customers to add functionality to the robot's base operation without imposing serious burdens on memory storage requirements and without requiring modification of the underlying decision-making logic. For example, an SDK user could add an animation that she herself constructed to the robot's animation library, and the robot can search for and use the user-provided animation tracks in the same ways as preinstalled animation tracks.

This makes all robot movements both more dynamic and more lifelike. In other words, the behavior of the robot seems more natural and less hard-coded. In addition, the robot's capabilities are improved by providing the ability to perform actions that are generated on the fly rather than only actions that are pregenerated. This has the effect that every action the robot does seems natural and lifelike. These effects make the robot easier to use and easier to understand, which increases user engagement and efficiency of operating the robot.

The separation of concerns between goal generation and animation generation also has tremendous benefits for robot developers. In particular, new animations being added to the collection of animations do not require code changes in the robot behavior. Rather, new animations are simply searched just like previously existing animations. This allows developers to work more quickly without concern for how particular motions are performed. Therefore, what the robot does and how the robot does it can actually be addressed by separate developers or even separate departments in a way that wouldn't otherwise be possible.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
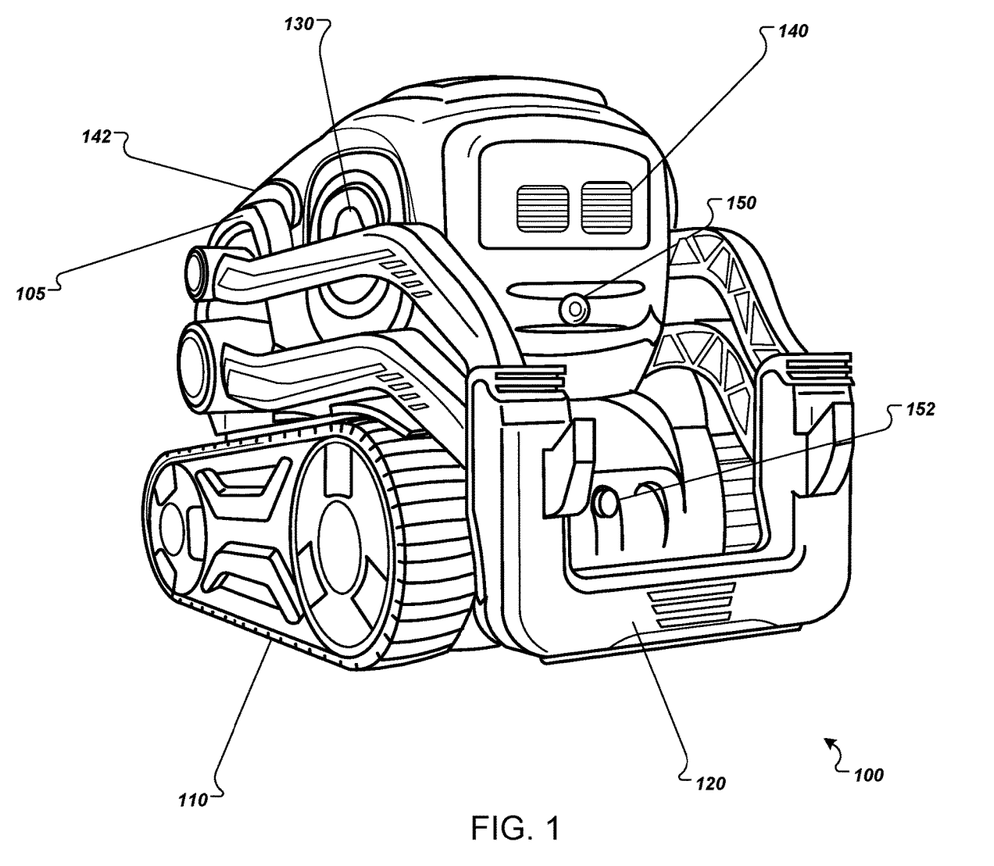
FIG. 1 illustrates an example robot.

FIG. 1 illustrates an example robot 100. The robot 100 is an example of a mobile autonomous robotic system on which the goal-based animation techniques described in this specification can be implemented. The robot 100 can use the techniques described below for use as a toy or as a personal companion.

The robot 100 generally includes a body 105 and a number of physically moveable components. The components of the robot 100 can house data processing hardware and control hardware of the robot. The physically moveable components of the robot 100 include a propulsion system 110, a lift 120, and a head 130.

The robot 100 also includes integrated output and input subsystems.

The output subsystems can include control subsystems that cause physical movements of robotic components; presentation subsystems that present visual or audio information, e.g., screen displays, lights, and speakers; and communication subsystems that communicate information across one or more communications networks, to name just a few examples.

The control subsystems of the robot 100 include a locomotion subsystem 110. In this example, the locomotion system 110 has wheels and treads. Each wheel subsystem can be independently operated, which allows the robot to spin and perform smooth arcing maneuvers. In some implementations, the locomotion subsystem includes sensors that provide feedback representing how quickly one or more of the wheels are turning. The robot can use this information to control its position and speed.

The control subsystems of the robot 100 include an effector subsystem 120 that is operable to manipulate objects in the robot's environment. In this example, the effector subsystem 120 includes a lift and one or more motors for controlling the lift. The effector subsystem 120 can be used to lift and manipulate objects in the robot's environment. The effector subsystem 120 can also be used as an input subsystem, which is described in more detail below.

The control subsystems of the robot 100 also include a robot head 130, which has the ability to tilt up and down and optionally side to side. On the robot 100, the tilt of the head 130 also directly affects the angle of a camera 150.

The presentation subsystems of the robot 100 include one or more electronic displays, e.g., electronic display 140, which can each be a color or a monochrome display or both. The electronic display 140 can be used to display any appropriate information. In FIG. 1, the electronic display 140 is presenting a simulated pair of eyes. The presentation subsystems of the robot 100 also include one or more lights 142 that can each turn on and off, optionally in multiple different colors.

The presentation subsystems of the robot 100 can also include one or more speakers, which can play one or more sounds in sequence or concurrently so that the sounds are at least partially overlapping.

The input subsystems of the robot 100 include one or more perception subsystems, one or more audio subsystems, one or more touch detection subsystems, one or more motion detection subsystems, one or more effector input subsystems, and one or more accessory input subsystems, to name just a few examples.

The perception subsystems of the robot 100 are configured to sense light from an environment of the robot. The perception subsystems can include a visible spectrum camera, an infrared camera, or a distance sensor, to name just a few examples. For example, the robot 100 includes an integrated camera 150. The perception subsystems of the robot 100 can include one or more distance sensors. Each distance sensor generates an estimated distance to the nearest object in front of the sensor.

The perception subsystems of the robot 100 can include one or more light sensors. The light sensors are simpler electronically than cameras and generate a signal when a sufficient amount of light is detected. In some implementations, light sensors can be combined with light sources to implement integrated cliff detectors on the bottom of the robot. When light generated by a light source is no longer reflected back into the light sensor, the robot 100 can interpret this state as being over the edge of a table or another surface.

The audio subsystems of the robot 100 are configured to capture from the environment of the robot. For example, the robot 100 can include a directional microphone subsystem having one or more microphones. The directional microphone subsystem also includes post-processing functionality that generates a direction, a direction probability distribution, location, or location probability distribution in a particular coordinate system in response to receiving a sound. Each generated direction represents a most likely direction from which the sound originated. The directional microphone subsystem can use various conventional beam-forming algorithms to generate the directions.

The touch detection subsystems of the robot 100 are configured to determine when the robot is being touched or touched in particular ways. The touch detection subsystems can include touch sensors, and each touch sensor can indicate when the robot is being touched by a user, e.g., by measuring changes in capacitance. The robot can include touch sensors on dedicated portions of the robot's body, e.g., on the top, on the bottom, or both. Multiple touch sensors can also be configured to detect different touch gestures or modes, e.g., a stroke, tap, rotation, or grasp.

The motion detection subsystems of the robot 100 are configured to measure movement of the robot. The motion detection subsystems can include motion sensors and each motion sensor can indicate that the robot is moving in a particular way. For example, a gyroscope sensor can indicate a relative orientation of the robot. As another example, an accelerometer can indicate a direction and a magnitude of an acceleration, e.g., of the Earth's gravitational field.

The effector input subsystems of the robot 100 are configured to determine when a user is physically manipulating components of the robot 100. For example, a user can physically manipulate the lift of the effector subsystem 120, which can result in an effector input subsystem generating an input signal for the robot 100. As another example, the effector subsystem 120 can detect whether or not the lift is currently supporting the weight of any objects. The result of such a determination can also result in an input signal for the robot 100.

The robot 100 can also use inputs received from one or more integrated input subsystems. The integrated input subsystems can indicate discrete user actions with the robot 100. For example, the integrated input subsystems can indicate when the robot is being charged, when the robot has been docked in a docking station, and when a user has pushed buttons on the robot, to name just a few examples.

The robot 100 can also use inputs received from one or more accessory input subsystems that are configured to communicate with the robot 100. For example, the robot 100 can interact with one or more cubes that are configured with electronics that allow the cubes to communicate with the robot 100 wirelessly. Such accessories that are configured to communicate with the robot can have embedded sensors whose outputs can be communicated to the robot 100 either directly or over a network connection. For example, a cube can be configured with a motion sensor and can communicate an indication that a user is shaking the cube.

The robot 100 can also use inputs received from one or more environmental sensors that each indicate a particular property of the environment of the robot. Example environmental sensors include temperature sensors and humidity sensors to name just a few examples.

One or more of the input subsystems described above may also be referred to as "sensor subsystems." The sensor subsystems allow a robot to determine when a user is interacting with the robot, e.g., for the purposes of providing user input, using a representation of the environment rather than through explicit electronic commands, e.g., commands generated and sent to the robot by a smartphone application. The representations generated by the sensor subsystems may be referred to as "sensor inputs."

The robot 100 also includes computing subsystems having data processing hardware, computer-readable media, and networking hardware. Each of these components can serve to provide the functionality of a portion or all of the input and output subsystems described above or as additional input and output subsystems of the robot 100, as the situation or application requires. For example, one or more integrated data processing apparatus can execute computer program instructions stored on computer-readable media in order to provide some of the functionality described above.

The robot 100 can also be configured to communicate with a cloud-based computing system having one or more computers in one or more locations. The cloud-based computing system can provide online support services for the robot. For example, the robot can offload portions of some of the operations described in this specification to the cloud-based system, e.g., for determining behaviors, computing signals, and performing natural language processing of audio streams.

Figure 2:
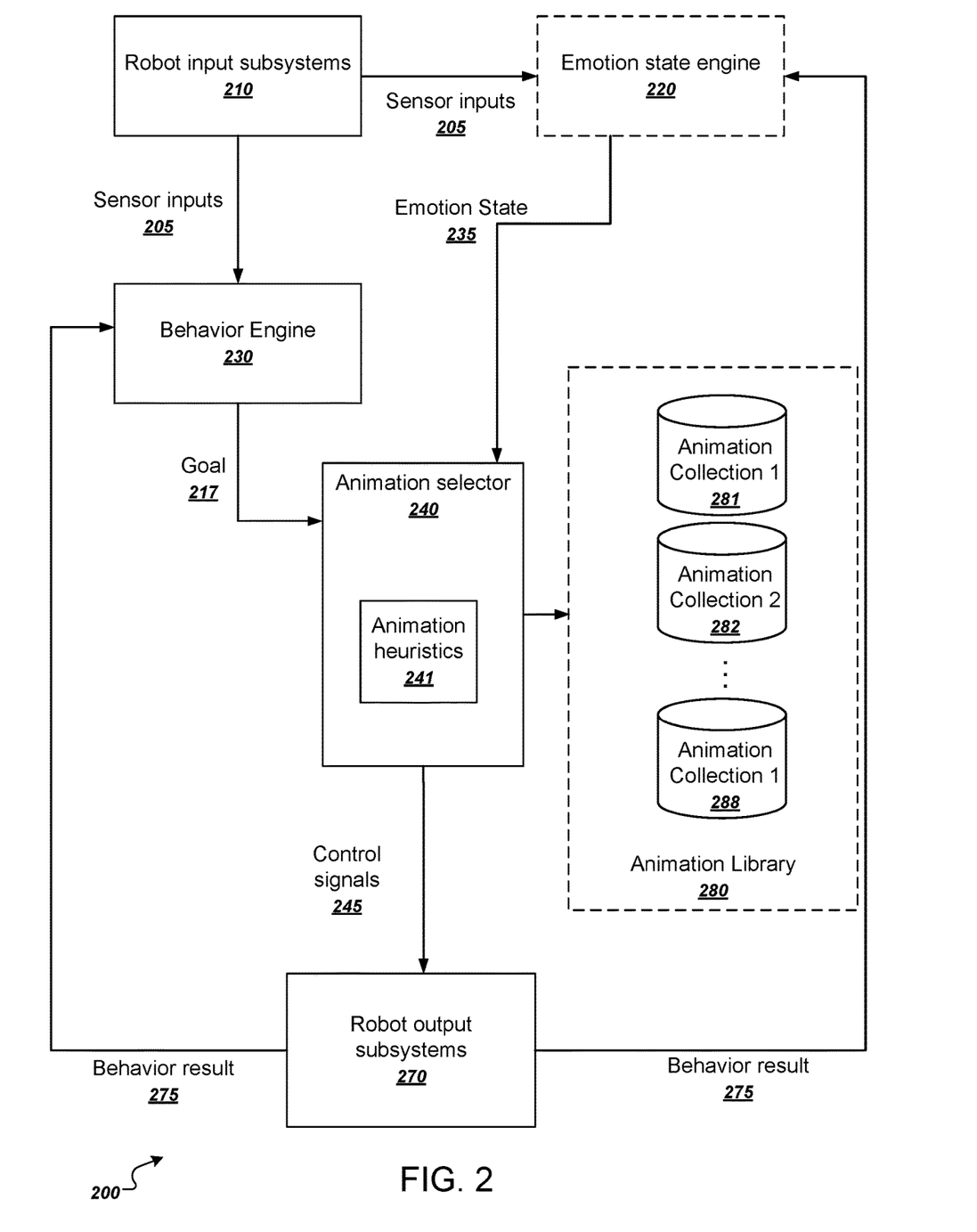
FIG. 2 illustrates the architecture of an example motion subsystem.

FIG. 2 illustrates the architecture of an example motion subsystem 200 of a robot. In general, the system 200 controls how the robot generates animations to satisfy a particular goal state.

The robot input subsystems 210 provide sensor inputs 205. Sensor inputs 205 include information such as obstacles observed by the robot or an indication of recognition of a user's face. The robot can obtain the sensor inputs using any appropriate combination of sensor subsystems described above. Each sensor subsystem generates a representation of the robot's environment that is particular to that sensor. For example, a camera can generate a color image of the environment, while a cliff sensor can generate an indication of whether or not surface-reflected light is detected.

The behavior engine 230 is subsystem that computes a next goal given a current robot state. For example, the behavior engine 230 can use artificial-intelligence or rule-driven techniques that takes as input the current robot state and generates a next goal as an output given the robot state. The goal can be influenced by a current representation of the environment as reflected by the sensor inputs 205, by direct or indirect user inputs, a current emotion state 235 of the robot, or some combination of these.

In general, a goal is data that specifies one or more goal states to be attained by the robot itself or one or more of its components. For example, a goal can specify a location within the robot's environment that the robot should attempt to navigate to. If the robot is positioned on a table, the behavior engine 230 can use a current position of the robot on the table to generate a goal that specifies that the robot should drive to a different location on the table.

A goal can also specify a particular position or orientation of one of the robot's components. For example, a goal can specify that the robot should turn and face a particular direction or directions. In the context of scanning the environment, for example, a goal can specify that the robot should face multiple directions in 3D space. As another example, the position could specify a particular region or a particular room within a building. If the robot is an aerial drone, the position can specify an aerial position, e.g., an altitude, above a particular surface. The goal may, but need not, specify an order in which the directions should be faced. A goal can also relate to non-physical tracks. For example, a goal can specify that the robot's simulated eyes should move to a particular position within an electronic display.

A goal can specify a single value or multiple values for a goal state. For example, a goal state can be expressed as a range of values, e.g., between 5 and 10 degrees, or as a set of admissible states, e.g., 5, 6, 7, 8, 9, or 10 degrees. A goal can have explicitly or implicitly specified thresholds that define when a particular goal state has been attained. For example, if a goal state threshold is 0.5 degrees, a turn of 4.6 degrees may be enough to satisfy a goal state of 5 degrees.

In this specification, satisfying or attaining a goal state means attaining a state that either falls with a range of values of the goal state or falls within an explicitly or implicitly specified threshold for the goal state.

A goal can also specify an action to be taken by the robot that does not relate to movement. For example, a goal can specify that the robot should use an imaging subsystem to determine if there are any users in a particular direction.

A goal can also have one or more subgoals. A subgoal is an intermediate robot state that is to be attained between the current state of the final goal state. Subgoals can be thought of as waypoints that the robot can use in attaining the goal state. As one example, if the behavior engine 230 can generate a goal of searching for a user in a particular direction. This goal in and of itself includes at least the action of turning in the particular direction and using an imaging subsystem to determine if any users are recognized in the particular direction.

The behavior engine 230 can enhance the goal by also including subgoals that further increase the information gathering capabilities of the robot. For example, the subgoals can specify a four points in 3D space toward which the robot should face before assuming the final goal state. The subgoals thus have the effect of causing the robot to perform a scanning action in the particular direction, which can increase the chances of correctly identifying users in the area.

A goal can also specify an antigoal constraint, which is a state that should be avoided when attempting to attain the goal state. For example, a goal can specify "navigate to location x" and an antigoal constraint "without getting within 2 inches of any cliffs." During the search process, the robot can use the antigoal constraints to prune the search space. This functionality adds further efficiency to the development process because the switch statements of a particular action do not need to account for undesirable situations.

A goal can also specify a duration, which can indicate that the goal is a one-time goal or a continuous goal. For example, a goal can specify that a robot should location to location x once. Alternatively, a goal can specify that a robot should continually maintain a relative position to an objection. In that situation, the robot can continually or periodically reevaluate whether or not the goal state is satisfied and take appropriate actions if necessary.

Notably, the behavior engine 230 need not specify how any of the goals will be carried out by components of the robot. Rather, the system uses an animation selector 240 to translate a goal generated by the behavior engine into a set of animation tracks that when executed effectuate the goal.

Thus, the animation selector 240 receives the goal 217 and searches an animation library 280 to determine a set of animation tracks to be executed to effectuate the goal. To do so, the animation selector 240 can determine a set of animation tracks that, when executed in the current robot state, cause the robot to satisfy the goal state specified by the goal.

For example, suppose the goal generated by the behavior engine 230 specifies that the robot should turn 20 degrees to the left. The animation selector 240 can then search the animation library 280 for a set of one or more animation tracks that achieves the specified goal. If the animation library 280 has an animation track that corresponds to a 20 degree turn, the animation selector 240 can select this animation track.

However, it is often the case that no single animation track by itself can effectuate the goal. For example, if the animation library 280 has only two tracks that move one side of the robot's locomotion subsystem to effectuate either a 3-degree turn or a 7-degree turn, the animation selector 240 has to choose at least two tracks in order to effectuate a 20-degree turn. For example, the animation selector 240 can select the 7-degree turn twice and the 3-degree turn twice. As another example, if the goal specifies a location to which the robot should navigate, the animation selector 240 can select one or more tracks that cause the robot to drive to the location.

In other words, the robot can search for a combination of tracks that effectuates the goal. In general, the dynamic selection of multiple tracks can result in the dynamic generation of a new animation that was not hard coded beforehand by human animators. However, if the goal state can be satisfied by one or more animation tracks that are part of a pregenerated animation, the robot can perform all tracks that are part of the pregenerated animation as opposed to only the tracks that effectuate the goal state.

The robot can employ a variety of techniques to perform the search efficiently. Although a worst-case search time can grows exponentially or factorially with the number of animations in the animation library 280, the animation selector 240 can use various pruning and optimization techniques to reduce the complexity of the search problem. For example, in general any search problem that involves identifying multiple tracks to cover a distance, e.g., in displacement or angle, can be efficiently solved by recursive subdivision. This process involves first identifying all animation tracks that are less than or equal to the distance, selecting a track having the greatest distance, and repeating the process for the remainder. For example, if the available tracks result in 7-degree, 3-degree, and 2-degree turns, using recursive subdivision for a 20-degree turn would first select the 7-degree track twice. The remainder at that point would be 6-degrees, which is less than 7, and thus on the next iteration, the animation selector would then select the 3-degree track twice.

To support fast searching, the animation library 280 can be organized using type-specific indexes. For example, all tracks that relate to turning a particular angle can be indexed in a binary tree, which allows for identifying in log(n) time a track having the largest value below the stated goal.

By using recursive subdivision with type-specific indexing, the animation selector 280 can rapidly generate one or more candidate animations for effectuating the goal. The animation selector 280 can then separately score and rank each candidate animation based on various criteria that are described in more detail below with reference to FIG. 4.

The animation selector 240 can also use a number of animation selection heuristics to sort the tracks in a particular animation. For example, between consecutive animation tracks, there may always be the risk of some lag or jerky transitions. Therefore, the animation selector 240 can sort the tracks in the animation such that tracks having longer distances always occur in between tracks having shorter distances. To the end user, this sorting mechanism will result in any jerkiness looking more natural and will appear to be the robot getting ready to turn, turning, and fine tuning the turn.

The animation selector 240 can also use a number of filters to narrow the search space. For example, the goal itself may specify a restriction on the types of tracks that are allowed to effectuate the goal. As one example, the goal may specify navigating from point A to point B very slowly, e.g., by specifying a speed limitation. The animation selector 240 can then use the speed limitation to automatically reject tracks that violate the speed limitation when performing the recursive search for candidates. Instead of filtering out tracks completely, the robot can instead assign a very severe penalty to the track but still include them in the searchable state. This approach can be preferable because it precludes the possibility of filtering out all possible animations so that the robot is left with no options. By assigning a penalty instead of a filter, the robot will always perform some action, even if it is not an ideal action.

In some implementations, the animation library includes multiple distinct collections of animations, e.g., the animation collections 281, 282, through 288. Although FIG. 2 illustrates the collections as being stored separately from each other, the distinct collections can be stored in the same database with the collections distinguished by different relations or in the same database relation with the collections distinguished by attribute.

The animation collections can be defined in a variety of ways. For example, each animation collection can be predefined to correspond to a respective value of the emotion state 235. Alternatively or in addition, each animation collection can be defined dynamically from input from the behavior engine 230 or by the goal itself. For example, the behavior engine 230 can specify that only fast-driving animations are to be considered.

The animation collections can include both animation tracks generated by the developer of the robot as well as third-party developer animations or customer-supplied animations. For example, the developer of the robot can publish an SDK that allows other developers or users to use a computer system to develop animation tracks. The third-party developers or users can then upload these animation tracks to the robot's animation library 280. The robot can then search these animation tracks to satisfy goal states in the same way that the robot searches the preinstalled animation tracks that were added by the robot developer.

The animation selector 240 can also select animations using collections of animation heuristics 241 that selectively apply boosts or penalties for candidate animations in different scenarios. The antigoal constraints described above, for example, can be implemented as heuristic functions that modify the score for particular situations. In general, the animation selector 240 can select an animation by applying one or more heuristics in order to evaluate animations in a particular animation collection. By having different heuristics, the system can further modularize the selection mechanism from the evaluation mechanism.

For example, a robot can have the following heuristics and animation collections:

Heuristic 1: Apply a large penalty to all left tread motions

Heuristic 2: Greatly penalize scores for animations that have a happy face

Animation Collection 1: All turning animations

Animation Collection 2: All animations related to "Rolling an object"

A behavior might occasionally need to select an animation from collection 1 while the robot is experiencing real or simulated damage such that the robot can't use its left tread. Thus, the robot can select an animation from collection 1 while applying heuristic 1. At a different time the robot might need to perform a turn that appears happy, and so the robot can set a goal of 20 degrees and select an animation from collection 1 while applying heuristic 2.

Another filtering mechanism is the emotion state 235 of the robot, which is maintained by an optional emotion state engine 220. In some implementations, the emotion state engine 220 generates an emotion state 235 in order to simulate emotional characteristics of the robot's behavior. For example, the emotion state engine 220 can generate an emotion state 235 that can influence the animation tracks selected by the animation selector 240. This in turn allows the robot to simulate emotions including happy, sad, angry, and cautious, to name just a few examples. Using the emotion state 235 in this way can enhance user engagement with the robot and can improve the interface between users and the robot by making the robot's actions and responses readily understandable.

The emotion state 235 for a robot can be a single-dimensional or a multi-dimensional data structure, e.g., a vector or an array, that maintains respective values for each of one or more different aspects. Each aspect can represent an enumerated value or a particular value on a simulated emotional spectrum, with each value for each aspect representing a location within that simulated emotional spectrum. For example, an example emotion state can have the following values: Happy, Calm, Brave, Confident, Excited, and Social, each of which may have a negative counterpart. The emotion states need not correspond to specifically identifiable human emotions. Rather, the emotion state can also represent other, more general or more specific spectrums that characterize robot behavior. For example, the emotion state can be a Social state that represents how eager the robot is to interact with users generally, a Want-To-Play state that represents how eager the robot is to engage in gameplay with a user, and a Winning state that represents how competitive the robot is in games. The emotion state can also correspond to a desired or impending change in external circumstances, such as changing the state of the user or an object, e.g., Want-to-Frighten or Want-to-Soothe. Emotion states can also correspond to current physical states of the robot, such as Needs-Repair and Hungry. Such states can manifest in the same sort of character and motion constraints as other emotion states.

By using the emotion state 235, the animation selector 240 can restrict the search space to tracks that conform to a particular emotion state and can automatically reject all others. The tracks themselves can be tagged in the animation library 280 with emotion state information that indicates under which emotion states the tracks are appropriate. When the animation library 280 is populated with tracks from pregenerated animations, the pregenerated animations may already be associated with emotion state information. For example, a pregenerated animation can be tagged as a "sad" animation. The animation library 280 can thus propagate this information by tagging all the tracks of the pregenerated "sad" animation as being tracks for the "sad" emotion state. Thereafter, if the robot is in a sad emotion state, the animation selector 240 can consider only tracks that are tagged with the sad emotion state (or are tagged as being commensurate with the sad emotion state) and can reject all others.

There are a number of ways that the animation library 280 can be generated to contain a rich selection of realistic and lifelike animation tracks. The tracks in the animation library 280 can be generated offline by a development computer system using manual and automatic population methods. The animation library 280 can then be loaded onto the storage subsystem of the robot at manufacturing time or at runtime.

A first source of animation tracks is pregenerated animations that the robot is programmed to perform. In other words, the tracks of all human-designed pregenerated animations for the robot can be parsed and indexed for fast searching and selection by the animation selector. This means that different tracks that were initially designed for different pregenerated animations can be combined into a same animation by the animation selector.

Another source of animation tracks are human-rated animation tracks. The development computer system can generate many different kinds of animation tracks and then receive ratings from human raters regarding how lifelife or characterful the tracks were when executed by a physical or a simulated robot. The human raters can be employed in-person or online. The animation library 280 can then be populated with additional animation tracks that have a sufficiently high rating. When the animation library 280 is populated with all or substantially all animation tracks have been designed to be high quality, substantially all actions performed by the robot will appear to be lifelike regardless of the circumstances.

The human-designed or human-rated animation tracks can also be used to extend the library with machine learning techniques. In particular, the human-designed or human-rated animation tracks can be used as training data for a model that is designed to learn the features of realistic, lifelike, or characterful animation tracks and output a score indicating the quality of the track. The development computer system can then use the generated model to automatically evaluate thousands or millions of candidate evaluation tracks, which can be automatically obtained by harvesting robot log data about tracks real-world deployed robots have taken. The candidate tracks can also be generated from a seed set of tracks by randomly or pseudorandomly varying various parameters of the tracks. The machine-learned scoring of animation tracks can be performed offline in a datacenter to leverage the power of massively parallel computing resources.

Figure 3A:
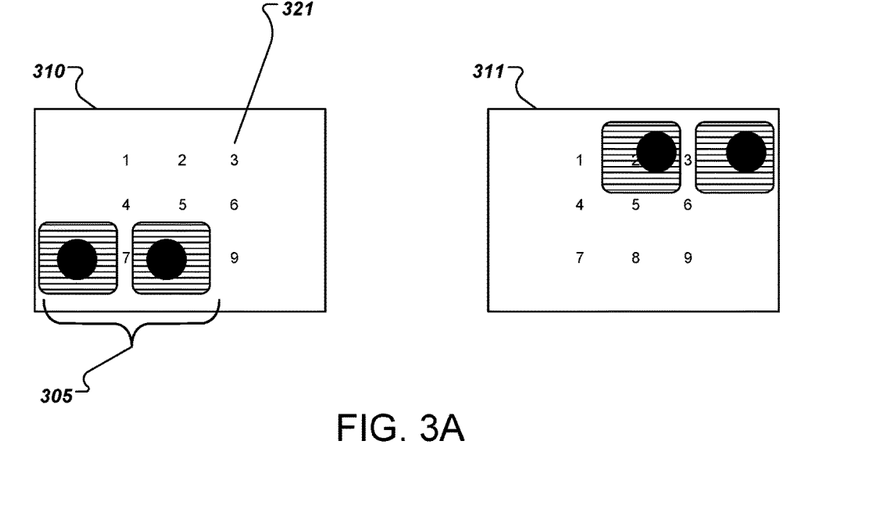
FIGS. 3A-3B illustrate an example of how animation selection can change due to newly added animation tracks.
Figure 3B:
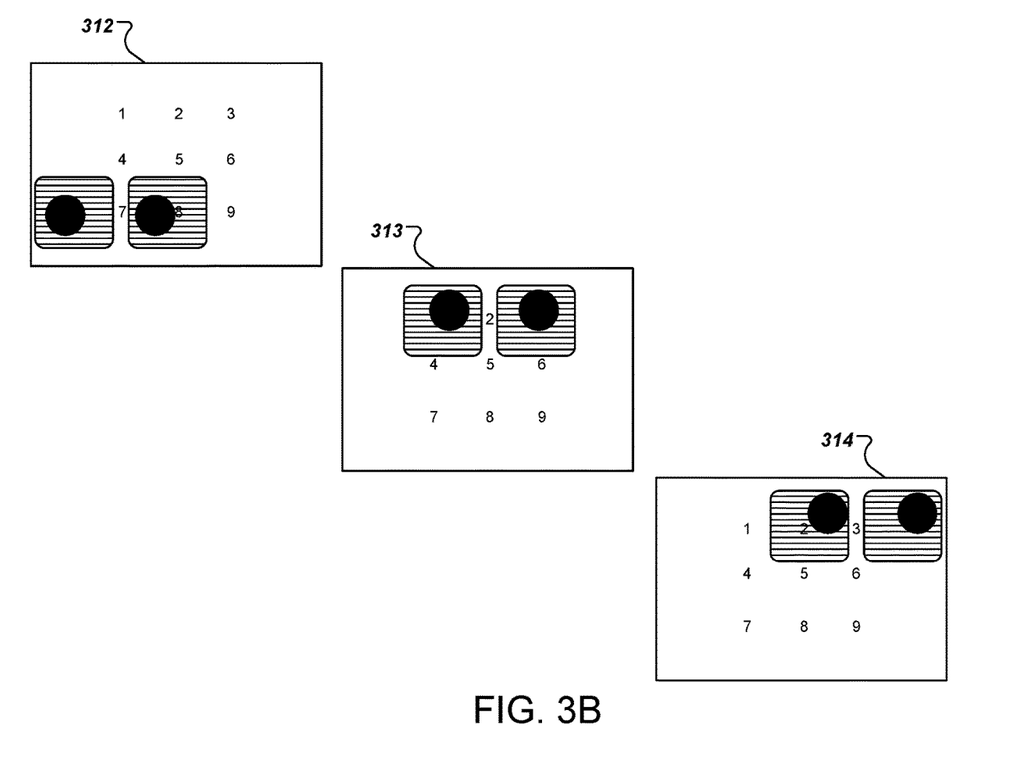

The functional isolation of concerns between the behavior engine that generates the goals and the animation selector that searches for animation tracks to effectuate the goals has a number of important advantages. First, the robot's capabilities are greatly increased. In other words, dynamically searching for animation tracks that satisfy a particular goal results in many more kinds of animations that could not be pre-coded. Therefore, the robot appears to users to be more autonomous and unpredictable, and therefore more lifelike. In addition, new animations can be added to the animation library 280 at any time without needing to modify any code of the behavior engine 230. FIG. 3 illustrates a concrete example of this.

FIGS. 3A-3B illustrate an example of how animation selection can change due to newly added animation tracks. In this example, the presentations 310, 311, 312, 313, and 314 are all examples of how simulated robot eyes 305 may be presented on an electronic display of the robot. Each of the position indicators from 1 through 9, e.g., the position indicator 321, is an example of data that can be used to encode a current state or a goal state for the simulated eyes.

FIG. 3A illustrates a first animation selection process. In the presentation 310, the eyes 305 are in the bottom-left corner of the display centered on position 7. An example goal state generated by a behavior engine can specify that that goal position of the eyes is position 3 in the top-right corner of the display. For example, this data can be encoded as follows:

goal-eye-position: 3

In this example, assume that the following animation 5 tracks from position 7 are available:
eye-transition 7->1
eye-transition 7->3
eye-transition 7->4
eye-transition 7->8
eye-transition 7->9

In this example, only the transition from position 7 to position 3 gets the eyes close to the goal position. Therefore, the animation selector can select the animation that provides the transition from position 7 to position 3, as shown in presentation 311. This transition can make the robot appear more lifelike, rather than flickering the eyes instantaneously from position 7 to position 3.

FIG. 3A illustrates a second animation selection process. Now it is assumed that an additional animation track has been added to the library, which is an eye transition from position 7 to position 2.

In this example, an eye-transition to position 2 does get the eyes close to the goal position. The animation selector can then search for and locate an animation track that transitions the eyes from position 2 to position 3. Therefore, the example of FIG. 3B shows that due to the additional animation being added to the library, a different animation sequence was selected in which the eyes transition from position 7 to position 2, and from position 2 to position 3.

There can be a number of reasons why the original animation from 7 to 3 could be disfavored in this second example. As described above, the tracks can be tagged with emotion state information, and the long eye transition from position 7 to position 3 may not be compatible with the current emotion state of the robot. When there are no other options, however, the robot may have no choice. But simply by adding another animation to the animation library, the robot has more chances to exhibit lifelike and emergent behaviors.

Figure 4:
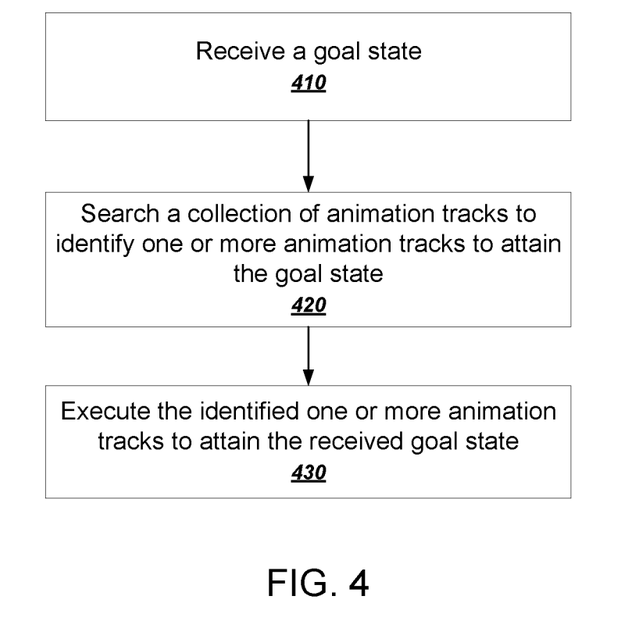
FIG. 4 is a flowchart of an example process for selecting one or more animation tracks for a particular goal state.

FIG. 4 is a flowchart of an example process for selecting one or more animation tracks for a particular goal state. The example process will be described as being performed by a robot programmed appropriately in accordance with this specification. For example, the robot 100 of FIG. 1, appropriately programmed, can perform the example process.

The robot receives a goal state (410). As described above, the goal state can be generated by a behavior engine that is functionally isolated from the components of the robot that perform animation selection.

The robot searches a collection of animation tracks to identify animation tracks to attain the goal state (420). As described above, the robot can use a variety of optimization techniques to speed up the process of searching the collection of animation tracks.

In some implementations, the robot generates multiple candidate animation tracks and selects an animation track from the candidates based on scoring function. The scoring function can take into consideration a variety of scoring features of the candidate set of animation tracks.

One example scoring feature is probability of danger or damage. For example, some robots have cliff sensors that detect edges of tables, desks, etc. If a candidate animation track involves getting close to dangerous areas, the scoring function can impose a large penalty on the score of the candidate set of animation tracks.

A related example scoring feature is disallowed actions. In some robot states, the animation selector can deem that certain tracks correspond to actions that are disallowed in that state. One example of this is when the robot determines that it is being held by a particular person, e.g., due to characteristic accelerations or touch sensors, the animation selector can designate all driving actions as disallowed. Therefore, the scoring function can impose a heavily penalty on a set of candidate tracks that has a disallowed action.

Another example scoring feature is time that it takes to complete the set of animation tracks. The scoring function can prefer candidate sets that take less time over candidate sets that take more time.

Another example scoring feature is a number of tracks that must be played in sequence in the set. The scoring function can use a distribution of weights that is centered on a particular preferred number of tracks. This approach balances out the extremes of choosing too few or too many animation tracks. For example, choosing one track might make the motion seem too robotic, while selecting 15 tracks can seem too random and too haphazard. For example, the lowest cost process of moving the eyes from FIG. 3A-B could be to move the eyes across every single pixel, since a high cost function might be applied to the eyes "jumping" across pixels because it could indicate a break in character. However, this might cause the eyes to appear lifelessly drifting across the screen rather than moving with purpose. By applying a "number of tracks" heuristic to the selection process, the robot can select animations which might cause the eyes to "jump" but do so with a sense of purpose. As one example, the scoring function can instead use a distribution that has the highest weight at 2 or 3 tracks and that tapers off toward either end of the distribution.

Another example scoring feature is concordance with the emotion state. As described above, each track in the animation library can be tagged with emotion state information that indicates in which emotion states the tracks are most appropriate. The description of FIG. 2 included an example in which the emotion state is used as a filter to avoid considering tracks having tags that do not match the current emotion state. Alternatively or in addition, the robot can use the emotion state information to score sets of candidate tracks by how much they are commensurate with the emotion state. For example, if the robot is in a "happy" emotion state, a candidate set having 80% happy tracks can be scored higher than another candidate set having only 20% happy tracks. This approach can be used to process a new emotion state, e.g. Elated, that is introduced alongside an existing state of Happy. Perhaps only a small number of elated animations have been introduced, but there's a large existing collection of happy animations. Scoring candidate tracks based on the percentage that they overlap with the ideal state allows the system to loosening the admissible states in the selection process. So comparing a set of tracks that has 20% elated tracks vs 80% happy tracks where a cost function has been established for using happy animations within an elated context might result in the robot selecting happy animations because the overall effect will be closer to elated than the limited set of explicitly tagged animations that are available.

After generating a score for each of the set of candidate tracks, the robot can rank the sets of candidate tracks and select a highest-scoring set of candidate tracks.

The robot executes the identified one or more animation tracks in order to attain the received goal state (430). Executing the animation tracks can cause the robot to turn in particular directions, drive to particular locations, scan areas for particular inputs, and other physically observable actions. Executing the animation tracks can also cause other visibly observable changes in the robot, e.g., changes in displays and other output subsystems of the robot.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For a robot to be configured to perform particular operations or actions means that the system has installed on it software, firmware, hardware, or a combination of them that in operation cause the robot to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a robot, a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A robot comprising:
a body and one or more physically moveable components; one or more processors; and
one or more storage devices storing instructions that are operable, when executed by the one or more processors, to cause the robot to perform operations comprising:
receiving a goal that specifies a goal state to be attained by the robot or one of the components;
searching a collection of animation tracks to identify one or more animation tracks that when executed by the robot cause the robot to perform one or more physical movements to satisfy the goal state;
executing the identified one or more animation tracks to perform the one or more physical movements to satisfy the received goal state; and
wherein the goal state specifies a position or a style and appearance of simulated robot eyes that corresponds to a current emotion state for the robot.

2. The robot of claim 1, wherein the goal state specifies a position or an orientation of the robot or one of the components.

3. The robot of claim 2, wherein the position is a room in a particular building or an aerial position above a surface.

4. The robot of claim 1, wherein searching the collection of animation tracks comprises: obtaining the current emotion state for the robot, wherein the current emotion state is one value of a plurality of different emotion states; and penalizing animation tracks that do not match the current emotion state for the robot.

5. The robot of claim 1, wherein searching the collection of animation tracks comprises recursively subdividing a distance between a current state of the robot and the goal state.

6. The robot of claim 1, wherein the operations further comprise:
generating a plurality of candidate sets of animation tracks;
computing a score for each of the plurality candidate sets of animation tracks; ranking the candidate sets of animation tracks by the respective scores; and selecting a highest-scoring candidate animation track.

7. The robot of claim 6, wherein computing a score for a candidate set of animation tracks comprises:
computing the score based on danger in the environment, a measure of time required to complete the candidate set of animation tracks, and a number of tracks in the candidate set.

8. The robot of claim 6, wherein computing a score for a candidate set of animation tracks comprises:
computing a measure of concordance of the tracks in the candidate set with a current emotion state of the robot.

9. The robot of claim 1, wherein the collection of animation tracks are each portions of pregenerated robot animations.

10. The robot of claim 9, wherein each pregenerated robot animation is a human-designed robot animation having multiple tracks.

11. The robot of claim 1, wherein the goal is received from a behavior engine that is functionally isolated from an animation selector that searches the collection of animation tracks.

12. The robot of claim 1, wherein the collection of animation tracks comprises human-designed animation tracks, human-rated animation tracks, or both.

13. The robot of claim 1, wherein the collection of animation tracks comprises animation tracks that were selected using a machine-learning model trained on human-designed animation tracks, human-rated animation tracks, or both.

14. A method performed by a robot, the method comprising:
    receiving a goal that specifies a goal state to be attained by the robot or one of a plurality of moveable components of the robot;
    searching a collection of animation tracks to identify one or more animation tracks that when executed by the robot cause the robot to perform one or more physical movements to satisfy the goal state; and
    executing the identified one or more animation tracks to perform the one or more physical movements to satisfy the received goal state; and
    wherein the goal state specifies a position or a style and appearance of simulated robot eyes that corresponds to a current emotion state for the robot.

15. The method of claim 14, wherein the goal state specifies a position or an orientation of the robot or one of the components.

16. The method of claim 15, wherein the position is a room in a particular building or an aerial position above a surface.

17. The method of claim 14, wherein searching the collection of animation tracks comprises:
    obtaining a current emotion state for the robot, wherein the current emotion state is one value of a plurality of different emotion states; and
    penalizing animation tracks that do not match the current emotion state for the robot.

18. The method of claim 14, wherein searching the collection of animation tracks comprises recursively subdividing a distance between a current state of the robot and the goal state.

19. A computer program product, encoded on one or more non-transitory computer storage media, comprising instructions that when executed by a robot having a body and one or more physically moveable components cause robot to perform operations comprising:
    receiving a goal that specifies a goal state to be attained by the robot or one of a plurality of moveable components of the robot;
    searching a collection of animation tracks to identify one or more animation tracks that when executed by the robot cause the robot to perform one or more physical movements to satisfy the goal state; and
    executing the identified one or more animation tracks to perform the one or more physical movements to satisfy the received goal state; and
    wherein the goal state specifies a position or a style and appearance of simulated robot eyes that corresponds to a current emotion state for the robot.

* * * * *